United States Patent [19]
Murphree

[11] 3,845,395
[45] Oct. 29, 1974

[54] HARMONIC SERIES SYNTHESIZER

[75] Inventor: Francis J. Murphree, McAllen, Tex.

[73] Assignee: The United States of America as represented by the Secretary of the Navy, Washington, D.C.

[22] Filed: Nov. 2, 1973

[21] Appl. No.: 412,069

[52] U.S. Cl. .................. 328/14, 328/27, 328/186
[51] Int. Cl. .................................... H03b 19/00
[58] Field of Search ................. 328/14, 27, 186; 235/150.53

[56] References Cited
UNITED STATES PATENTS

| | | | |
|---|---|---|---|
| 3,300,726 | 1/1967 | Newman | 328/14 X |
| 3,544,906 | 12/1970 | Dulaney et al | 328/14 |
| 3,657,657 | 4/1972 | Jefferson | 328/14 |

Primary Examiner—Stanley D. Miller, Jr.
Assistant Examiner—B. P. Davis
Attorney, Agent, or Firm—Richard S. Sciascia; Don D. Doty; Harvey A. David

[57] ABSTRACT

A harmonic series synthesizer is disclosed that utilizes combined analog and digital techniques to provide a complex waveform wherein individual frequency components are attenuated in accordance with a digital program. The synthesizer is described in relation to use in simulating acoustic signatures propagated through water.

11 Claims, 4 Drawing Figures

3,845,395

HARMONIC SERIES SYNTHESIZER

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention relates to harmonic series synthesizers and more particularly to improved forms thereof utilizing novel combinations of digital and analog techniques to synthesize complex waveforms having certain predetermined frequency characteristics.

One important application for such an improved harmonic series synthesizer is in the art of simulation for training purposes. In sonar simulating trainers it is desireable to incorporate the ability to simulate acoustic signatures of ships, which signatures are characteristically varied by range, water temperatures, ship speed, attitude and the like. It is well known, for example, that attenuation of acoustic energy being propagated over a given range through water varies as a function of frequency. Since the acoustic signature of any given vessel is a mixture of different frequencies, often harmonically related, realistic simulation thereof can only be accomplished if the different rates of attenuation be represented.

Because the number of variables involved in simulating different situations and ship signatures is quite large, the earlier used techniques of direct recording and playback would be inordinately cumbersome and expensive if more than a few types of ship signatures and tactical situations were to be incorporated into a trainer capability. Accordingly, it is desirable to have an ability to generate or synthesize acoustic signatures without actual acoustic recordings, but under the control of program commands which themselves can be derived from any convenient form of data storage, or from a computer that is responsive to one or more student or instructor inputs during a tactical simulation exercise.

Moreover, it is frequently desireable to be able to run a simulation program at a program speed that is different than real speed. For example, accelerated program speed can be used to emphasize or clarify the development of certain tactical situations, reduce class time requirements and the like. Additionally it may be desireable to be able to "freeze" a program problem at any time so that the instructor can point out student errors, and then to reverse and replay the sequence involved at a slow rate, all without deviating from the acoustic signature frequencies that should be presented at each point in program time. This flexibility of program timing while still having accurate acoustic representation is technically extremely difficult and costly using existing techniques wherein the acoustics are directly recorded and played back.

DISCUSSION OF THE PRIOR ART

Various harmonic frequency generators have been proposed heretofore wherein the outputs of a plurality of oscillators or other sources of frequencies $f, 2f, \ldots nf$ are combined to provide a complex waveform. Among these are U.S. Pat. No. 2,478,973 to A. A. Mahren and U.S. Pat. No. 3,245,001 to A. W. Barber. The outputs of the frequency sources are individually adjusted in relative strength or amplitude as desired in the combined result. These prior art synthesizers, while useful for their intended purpose as sources of signals for use in testing various electrical equipments, lack the flexibility, reliability, compactness, and compatability with modern digital and hybrid analog/digital simulation systems that are desired for the applications contemplated by the present invention.

SUMMARY OF THE INVENTION

The invention aims to overcome most or all of the disadvantages of the prior art through the provision of an improved harmonic series synthesizer that utilizes digital techniques and components in novel combinations and arrangements.

With the foregoing in mind, it is one object of the invention to provide an improved harmonic series frequency synthesizer that can operate from a source of digital command signals, recorded or otherwise, to produce an output in the form of a signal having a plurality of sine wave harmonic frequency components that vary in frequency and amplitude in accordance with the command signals.

Another object is to provide a harmonic frequency synthesizer of the foregoing character that utilizes frequency generator means comprising memory means having a plurality of samples of a sine wave at addresses that are read out at rates determined by a digitally controlled, variable clock source.

Yet another object of the invention is the provision of digitally controlled attenuator means for regulating the amplitude of each of a plurality of frequency generators prior to combination of those outputs into a single complex waveform output.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
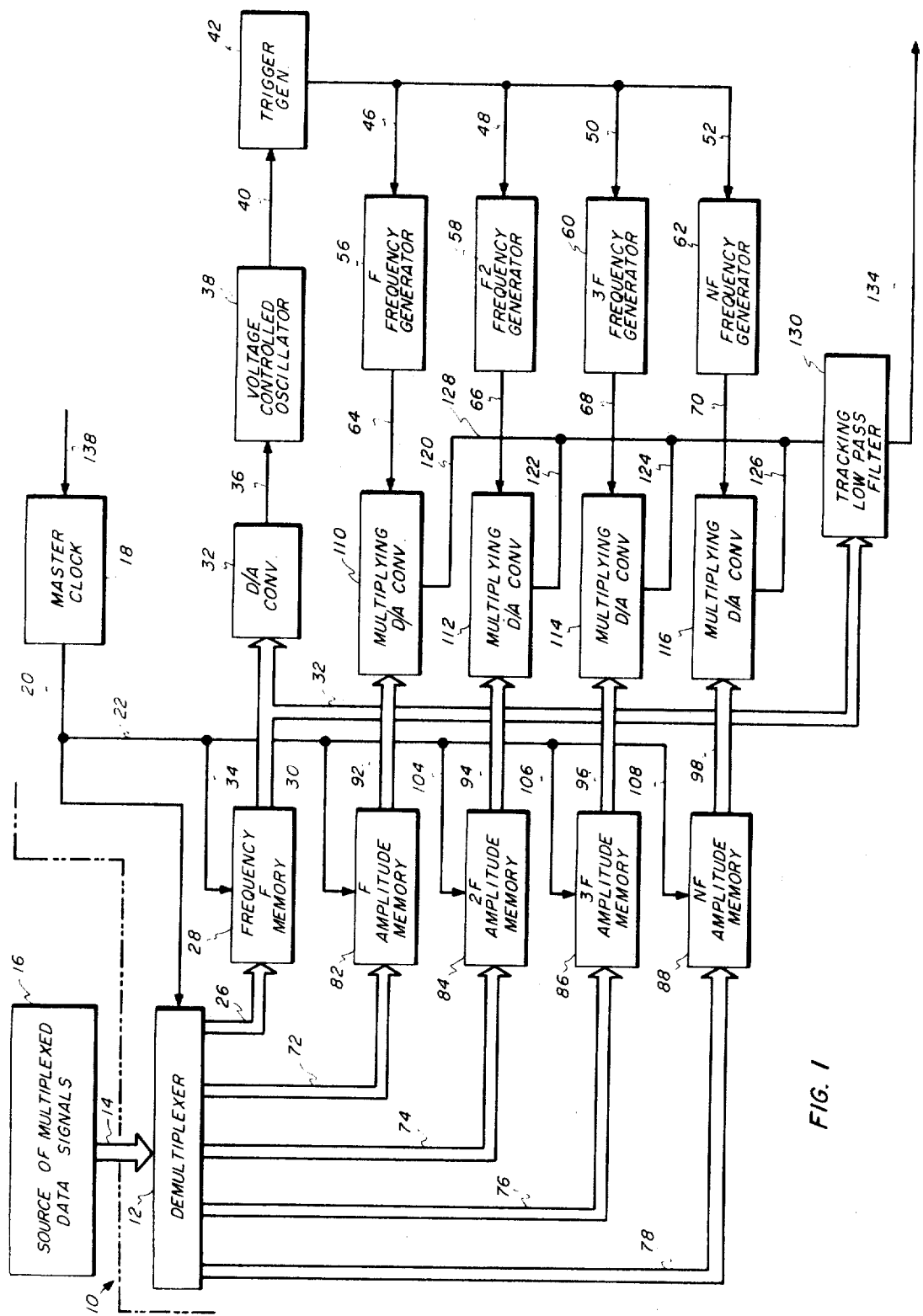
FIG. 1 is a diagrammatic illustration, in block form, of a harmonic series synthesizer embodying the invention.

Referring now to FIG. 1, a harmonic frequency synthesizer, generally indicated at 10, comprises a demultiplexer 12 that receives multiplexed data signals, collectively represented by broad arrow flow line 14, from a source 16. It should be noted that the synthesizer 10 being described is a hybrid of analog and digital components. For the sake of clarity, multi-bit digital word signals will be represented by broad arrow flow lines, while single bit digital signals and analog signals will be depicted by single flow lines. The source 16, which may be a computer data bank portion of a sonar simulating trainer, for example, comprises no part of the invention per se. Suffice it to say that it provides data regarding a fundamental frequency $f$ and regarding the respective amplitudes of frequency $f$ and a plurality of harmonics thereof $2f, 3f \ldots nf$. Thus, the multiplexed data signals 14 from source 16 comprise n different amplitude data signal components and one additional data signal component for the fundamental frequency $f$.

A variable master clock 18 is connected, as shown by line 20, to provide timing signals to source 16 and to demultiplexer 12. Demultiplexer 12 separates the incoming signal components and provides a corresponding plurality of digital memory address signals. One of these address signals is represented by line 26 and is applied to a frequency $f$ memory 28. Memory 28 conveniently comprises a random access memory device of conventional construction that has been previously loaded with program data so as to be capable of providing a stored digital output signal for each incoming address signal. In the present instance the digital output signals, preferably in multi-bit binary word form, represent the instantaneous value of fundamental frequency $f$ and are applied as shown by line 30 to a digital to analog converter 32. Timing signals from clock 18 are provided to memory 28 via lines 22 and 34 to assure synchronous operation thereof.

Digital to analog converter 32 provides an analog voltage, as shown by line 36, to the control input of a voltage controlled oscillator 38. Oscillator 38 is thereby caused to operate at some predetermined multiple M of the fundamental frequency $f$ called for in the data supplied by source 16, and provides a signal of frequency $Mf$, via line 40, to a trigger generator 42. When the source data calls for a change in fundamental frequency $f$, for example, when a ship, the signature of which is being simulated, changes speed, that change is reflected in the output frequency of oscillator 38 to trigger generator 42.

The output of trigger generator 42 is in the form of a string of trigger pulses at frequency $Mf$ that are applied, as shown by lines 46, 48, 50, and 52 to frequency generators 56, 58, 60, and 62, respectively. Generators 56, 58, 60, and 62, discussed more fully hereinafter with reference to FIG. 2, respectively provide sine wave output signals of frequency $f, 2f, 3f \ldots nf$, represented by lines 64, 66, 68, and 70.

In accordance with this invention those sine wave output signals are respectively and variously attenuated by controlled amounts before combination into a complex harmonic output signal. To this end, demultiplexer 12 provides digital memory address signals, represented by lines 72, 74, 76, and 78 to amplitude memories 82, 84, 86, and 88, respectively. These memories, conveniently of a type similar to memory 28, provide multi-bit binary word outputs, shown by lines 92, 94, 96, and 98, representing respective amplitude factors of frequencies $f, 2f, 3f \ldots nf$ called for in the data from source 16. Timing signals from clock 18 are applied, as shown by lines 102, 104, 106, and 108 to the amplitude memories to maintain timed relation to the rest of the synthesizer and to source 16.

The actual attenuations of the sine wave signal outputs of frequency generators 56, 58, 60, and 62 are respectively accomplished by multiplying digital to analog converters 110, 112, 114, and 116 in response to the digital inputs from amplitude memories 82, 84, 86, and 88. These multiplying digital to analog converters are conveniently of the type described in Section 2.2 of "Hybrid Computation," a book published by John Wiley & Sons, Inc., Library of Congress Catalog Card No. 68-8103 SBN 471 06355 x.

The resulting, variously attenuated sine wave outputs of frequencies $f, 2f, 3f \ldots nf$ of converters 110, 112, 114, and 116 are respectively applied as shown by lines 120, 122, 124, and 126 to a common or summing line 128 which is the input connection to a tracking low pass filter 130. Filter 130 is digitally controlled, as by the output of frequency f memory 28 via lines 30 and 132, to maintain its cut-off frequency a predetermined amount above the varying fundamental frequency $f$. The output of filter 130, represented by line 134 is a harmonic frequency signal that is characterized by the fundamental $f$ and $n$ harmonic frequencies, blended with varying degrees of amplitude, for example to simulate the different degrees of attenuation suffered by different frequencies within an acoustic signature of a ship.

Master clock 18 is conveniently provided with some suitable means for external rate control, for example a voltage represented by line 138 if clock 18 comprises a voltage controlled oscillator. The rate of operation of the synthesizer may thereby be controlled to carry out a simulation exercise or problem at a real time rate, or if desired at some faster or slower rate without causing any frequency changes in the synthesized harmonic frequency output other than as called for in the simulation program. Moreover, the master clock can be stopped in conjunction with "freezing" of the program while the synthesizer 10 maintains the proper harmonic series output for the program time.

Filter 130 may, if desired for sake of simplicity, be replaced by individual fixed low pass-filters in each of the output lines 120, 122, 124, and 126.

Figure 2:
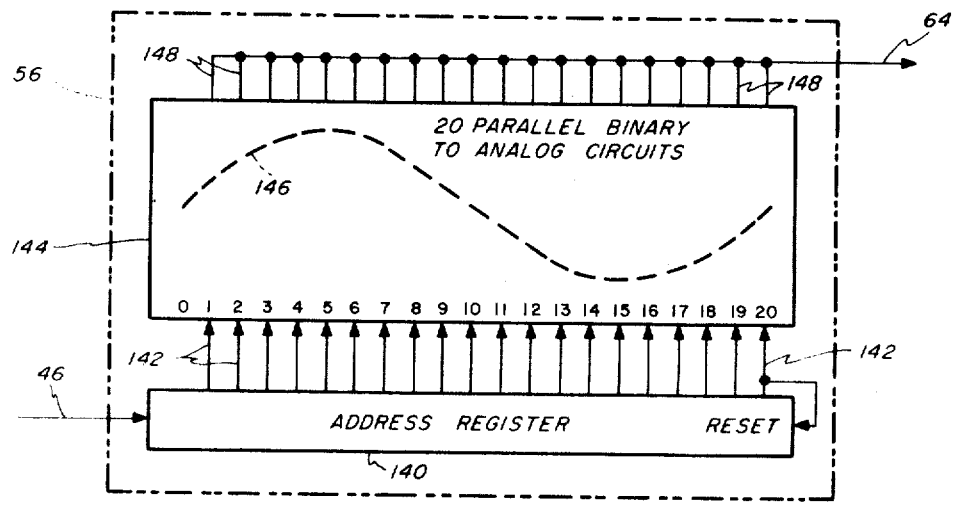
FIG. 2 is a diagrammatic illustration in greater detail of a frequency generator of the synthesizer of FIG. 1.

Referring now to FIG. 2, the fundamental frequency f generator 56 will be described in more detail. Generator 56 conveniently comprises an address register or counter 140 that receives serial incoming trigger signals via line 46 from trigger generator 42. It will be recalled that these trigger signals occur at a frequency of $Mf$. M is selected to be the number of points necessary to construct a single cycle of a waveform that sufficiently approximates a sine wave for the desired purposes. In the present example M has been selected as 20, but it will be understood that more or fewer may be used. Address register 140 has M or 20 binary outputs represented by parallel lines 142 that are connected to 20 respective address inputs of a read only memory 144 in the form of 20 parallel binary to analog circuits. Each address of memory 144 represents one amplitude or ordinate point of a stored sine wave 146, illustrated graphically in FIG. 2. As the individual output lines 142 go successively from a 0 to a 1 condition, corresponding individual output lines 148 are energized with voltage signals that are analogous of the corresponding ordinate points of sine wave 146. Output lines 148 are connected in common to line 64 for application to converter 110. It will be appreciated that the output on line 64 will be a close approximation of a sine wave having one complete cycle for each M, or 20, input trigger signals. The actual frequency output on line 64 is, of course, a function of the time required to read all 20 addresses. This is determined by the $Mf$ output frequency of oscillator 38.

Figure 3:
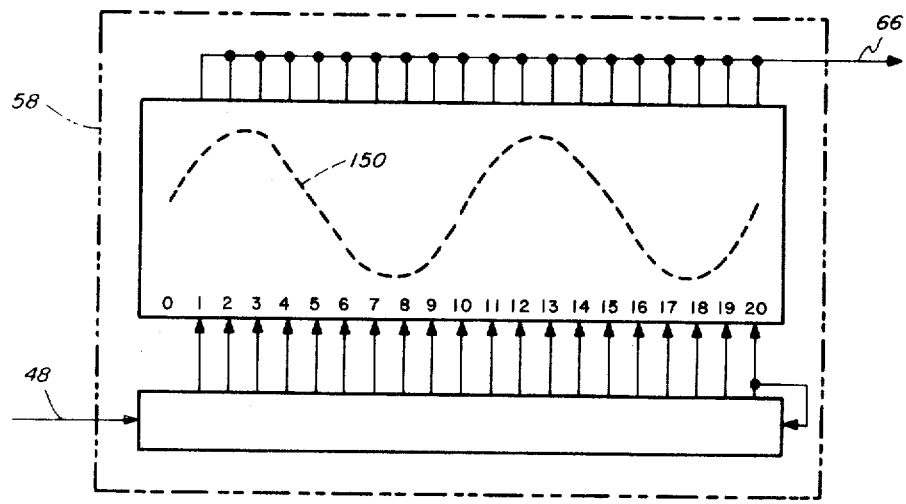
FIG. 3 is a diagrammatic illustration of another frequency generator.

When the twentieth address is reached, register 140 is reset to zero, whereby the waveform 146 is continuously repeated at the desired fundamental frequency $f$. The $2f, 3f \ldots nf$ generators 58, 60, 62 are identical to generator 56 just described except they are programmed to read out 2, 3 ... $n$ complete cycles of a sine wave for each M trigger signals. Thus, the $2f$ frequency generator 58 of FIG. 3 is shown as having stored, in the memory thereof, two complete cycles of a sine waveform 150. Inasmuch as the Mth value of each of the generators 56, 58, 60, and 62 is zero, there are no discontinuities as the address registers cycle.

In the event the dynamic range required of the simulation problem to be handled by synthesizer 10 is large, it may be desireable to provide multi-stage multiplying digital to analog conversion means for accomplishing the desired attenuation of the $n$ frequency components.

Figure 4:
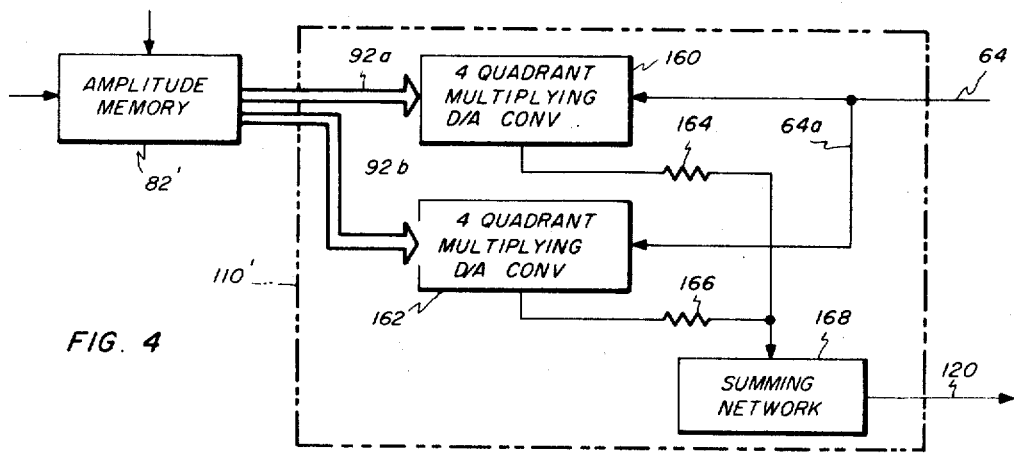
FIG. 4 is a diagrammatic illustration of a variation of a digitally controlled attenuator.

Thus, FIG. 4 illustrates a digitally controlled attenuator 110' wherein N bit digital data, arriving from an amplitude, memory means such as 82', comprises a series of N/2 more significant bits represented by line 92$a$ and a series of N/2 less significant bits represented by line 92$b$. The more significant data is applied to a four quadrant multiplying digital to analog converter 160 which also receives, via line 64, the fundamental frequency signal. The less significant data is applied to a four quadrant multiplying digital to analog converter 162 which also receives, via line 64$a$, the fundamental frequency signal.

The outputs of converters 160 and 162 are fed via resistors 164 and 166, respectively, to a common input to a summing network 168. The resistance $R_2$ of resistor 164 bears the following relation to resistance $R_1$ of resistor 162:

$$R_2 = R_1 (2)(N/2)$$

The output of summing network 168 is applied via line 120 as the attenuated value of the fundamental frequency component.

It should be noted that while the term "attenuation" has been used, it will be understood that the invention contemplates that this includes negative attenuation or augmentation of a frequency component as well.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A harmonic series synthesizer for generating a complex waveform from data signals representing a fundamental frequency f and relative amplitudes of n harmonically related frequency components including said fundamental frequency, said synthesizer comprising:

fundamental frequency memory means, responsive to said data signals, for providing first digital word output signals representative of a predetermined fundamental frequency;

first digital to analog converter means, responsive to said first digital word output signals, for providing a first analog signal representative of said fundamental frequency;

controlled oscillator means, responsive to said first analog signal, for providing an oscillator signal proportional to M$f$, where M is a predetermined number of ordinate voltage values;

trigger generator means, responsive to said oscillator signal, for providing trigger pulses at said frequency M$f$;

$n$ frequency generator means, responsive to said trigger pulses, for producing $n$ sine wave signals of frequencies $f, 2f, 3f \ldots nf$;

$n$ amplitude memory means, responsive to said data signals, for providing n digital word output signals representative of predetermined amplitudes of corresponding ones of said $n$ frequency components;

$n$ attenuator means, responsive to said $n$ sine wave signals and to said $n$ digital word output signals, for attenuating said $n$ sine wave signals to provide said $n$ frequency components having said relative amplitudes; and means for combining said $n$ frequency components into a complex waveform output signal.

2. A synthesizer as defined in claim 1, and wherein:

said fundamental frequency memory means comprises a memory device having a plurality of addresses and a corresponding plurality of frequency defining digital words stored at said addresses and representing a plurality of frequencies from which said fundamental frequency may be selected by said data signal.

3. A synthesizer as defined in claim 2, and wherein:

said memory device comprises a random access memory device.

4. A synthesizer as defined in claim 2 and wherein:

each of said n amplitude memory means comprises a memory device having plurality of addresses and a corresponding plurality of amplitude factor defining digital words stored at said addresses and representing a plurality of amplitude factors from which factors for producing said predetermined amplitudes may be selected by said data signals.

5. A synthesizer as defined in claim 4, and wherein:

said memory devices comprise random access memory devices.

6. A synthesizer as defined in claim 4, and further comprising:

master clock means for providing timing signals to said fundamental frequency memory means and to said n amplitude memory means.

7. A synthesizer as defined in claim 6, and wherein each of said n frequency generators comprises:

a memory device having M addresses corresponding to sequential abscissa points for a stored sine wave having a predetermined number of whole cycles, and having an ordinate value therefore stored at each of said addresses; and address register means, responsive to said trigger signals, for repeatedly sequentially providing individual reading inputs to said M addresses;

whereby ordinate values of said stored sine wave are read out at a rate that approximates a sine wave signal having a frequency of a predetermined one of said n frequencies.

8. A synthesizer as defined in claim 7, and wherein:

said memory device having M addresses comprises M parallel binary to analog converters; and said address register means comprises a counter.

9. A synthesizer as defined in claim 8, and wherein:

each of said n attenuator means comprises a multiplying digital to analog converter.

10. A synthesizer as defined in claim 9 and wherein:

said data signals are received in the form of a multiplexed signal;

said synthesizer further comprises demultiplexer means for separating said multiplexed signal into a fundamental frequency representing digital word and n amplitude determining digital words.

11. A harmonic series synthesizer for generating an acoustic signal simulating waveform, including n harmonically related frequency components, from a multiplex signal including data representative of a fundamental frequency f and n amplitude factors, said synthesizer comprising:

a source of master clock signals;

demultiplexer means, responsive to said clock signals and said multiplex signal, for providing a fundamental frequency defining digital word signal and n amplitude defining digital word signals;

a first digital to analog converter, responsive to said fundamental frequency defining digital word signal, for providing an analog voltage signal corresponding to a fundamental frequency;

a voltage controlled oscillator, responsive to said analog voltage signal for providing an oscillator signal having a frequency proportional to M$f$, where M is a predetermined number of ordinate samples from which a predetermined number of sine wave cycles can be constructed;

a trigger signal generator, responsive to said oscillator signal, for generating trigger pulses at the frequency of said oscillator signal;

n frequency generators, each comprising a memory device in which ordinate values of a predetermined sine wave are stored at M predetermined addresses, and address register means responsive to said trigger signals to read out said ordinate values, whereby n harmonically related sine wave signals are generated simultaneously, irrespective of changes in said fundamental frequency;

n amplitude memory devices each having a plurality of input addresses at which are stored a corresponding plurality of amplitude factor representing digital words, each of said amplitude memory devices being responsive to said amplitude data signals to provide amplitude factor representing digital word signals;

n multiplying digital to analog converters, responsive to said amplitude factor representing digital word signals and to respective ones of said harmonically related sine wave signals to provide n variously attenuated and harmonically related sine wave signals;

summing means for combining said n variously attenuated and harmonically related sine wave signals into a single complex waveform; and low pass filter means for excluding frequency components above a predetermined frequency from said complex waveform.

* * * * *